US008125162B2

(12) United States Patent
Gater et al.

(10) Patent No.: US 8,125,162 B2

(45) Date of Patent: Feb. 28, 2012

(54) CURRENT MIRROR CIRCUIT

(75) Inventors: Chris Gater, Dunblane (GB); Rudolf G Van Ettinger, West Lothian (GB)

(73) Assignee: Micrel, Inc, San Jose, CA (US)

( * ) Notice: Subject to any disclaimer, the term of this patent is extended or adjusted under 35 U.S.C. 154(b) by 254 days.

(21) Appl. No.: 12/658,997

(22) Filed: Feb. 18, 2010

(65) Prior Publication Data

US 2011/0199018 A1 Aug. 18, 2011

(51) Int. Cl.

| | |
|---|---|
| ***G05F 1/00*** | (2006.01) |
| ***H05B 37/02*** | (2006.01) |
| ***H05B 39/04*** | (2006.01) |
| ***H05B 41/36*** | (2006.01) |
| ***H02J 3/14*** | (2006.01) |

(52) U.S. Cl. .......................... 315/294; 307/31; 315/297

(58) Field of Classification Search .................. 315/294, 315/297; 307/31

See application file for complete search history.

(56) References Cited

U.S. PATENT DOCUMENTS 5,061,861 A * 10/1991 Sameshima et al. .......... 327/109

* cited by examiner

*Primary Examiner* — Jacob Y Choi

*Assistant Examiner* — Henry Luong

(57) ABSTRACT

The present invention provides a current mirror circuit for matching current between two LEDs. The current mirror circuit includes a first sub-circuit, including a first transistor, a second transistor, and a first OPAMP, and a second sub-circuit including a third transistor, a fourth transistor, and a second OPAMP. The first sub-circuit is connected to a first LED and the second sub-circuit is connected to a second LED. The current mirror circuit also includes four switches which continuously switch the currents flowing through the first LED and the second LED to maintain a same average current through both the LEDs. This way, better current matching is achieved than possible using conventional current mirror circuits. The frequency of switching of currents is kept above the flicker perception of human eye, so that a person viewing the LEDs is unable to detect any changes in the illumination of the LEDs.

24 Claims, 3 Drawing Sheets

CURRENT MIRROR CIRCUIT

FIELD OF THE INVENTION

The present invention relates to current mirror circuits and, more specifically, to a light emitting diode (LED) driver circuit for matching current between two or more LEDs.

BACKGROUND

A current mirror circuit is generally used to "copy" a reference current flowing through one transistor to another transistor of the circuit. These circuits are typically used in equipment that requires current flowing through one or more inbuilt electronic devices to be exactly the same or at least be very close to each other. For example, these circuits find their utility in liquid crystal display (LCD) backlights, portable keypads, amplifiers, monitors, screens using light emitting diodes (LEDs), etc.

A conventional current mirror circuit 100 is shown in FIG. 1. As depicted, current mirror circuit 100 includes a first transistor 102, a second transistor 104, and a resistor 106 connected between the drain terminal of second transistor 104 and a supply voltage (shown as $V_{DD}$). An electronic device 108 is also shown connected between the drain terminal of first transistor 102 and a supply voltage (shown as $V_S$). This electronic device can be, for example, an LED.

Although first transistor 102 and second transistor 104 are shown as n-type metal-oxide-semiconductor (NMOS) transistors in FIG. 1, current mirror circuits with p-type metal-oxide-semiconductor (PMOS) transistors, n-p-n bipolar junction transistors (BJTs), and p-n-p BJTs are also well known in the art. Therefore, even though the following description of current mirror circuit 100 relates to NMOS transistors, similar description is applicable to current mirror circuits using PMOS transistors, n-p-n BJTs, or p-n-p BJTs.

Current mirror circuit 100 is used to maintain equality between the current ($I_{out}$) flowing through electronic device 108 and a reference current ($I_{ref}$) flowing through second transistor 104. To achieve this, the drain and the gate of second transistor 104 are shorted so that it operates in saturation mode, and the gate of first transistor 102 is connected to the gate of second transistor 104 so that both the transistors have the same gate to source voltage. Also, the drain voltage of transistor 102 is maintained such that transistor 102 is also working in saturation mode. As depicted in FIG. 1, the source terminals of both the transistors are shorted and connected to ground.

The current flowing through a transistor working in saturation mode is given by the following equation: $I=\beta\times(V_{GS}-V_{TH})^2\times(W/L)$. Hence if first transistor 102 and second transistor 104 are identical, the current flowing through them is equal if the same gate to source voltage is applied to them. In the above equation, $\beta$ is a constant for a transistor and depends on transistor dimensions and materials used for fabricating it, $V_{GS}$ is the gate to source voltage applied to the transistor, $V_{TH}$ is the threshold voltage of the transistor, and W/L (also called aspect ratio of the transistor) is the ratio of the width of the channel region to the length of the channel region of the transistor. As apparent from the equation, if two transistors use identical materials and have the same dimensions, the current flowing through them is approximately equal given that the gate voltages applied to them are the same (because $\beta$ and $V_{TH}$ will also be the same if both transistors have the same dimensions and materials). In current mirror circuit 100, first transistor 102 and second transistor 104 are assumed to be identical, and therefore the reference current $I_{ref}$ is equal to the output current $I_{out}$ flowing through first transistor 102 (and electronic device 108).

The limitation of current mirror circuit 100 is that although the two transistors are "assumed" to be identical, in practical applications this is usually not the case. Even if efforts are made to manufacture two transistors with identical W/L and fabricating materials, absolute similarity is usually not achieved between two transistors using conventional manufacturing processes.

In light of the above, a current mirror circuit is required which provides current matching between two transistors, even if the transistors are not completely identical.

SUMMARY OF THE INVENTION

According to an embodiment of the present invention, a current mirror circuit for controlling current through a first electrical device and a second electrical device is provided. The current mirror circuit includes a current generator for generating a first current for the first electrical device and a second current for the second electrical device. In accordance with an embodiment of the present invention, the first and second electrical devices are light emitting diodes (LEDs).

The current mirror further includes a first sub-circuit corresponding to the first electrical device. The first sub-circuit includes a first transistor connected to the current generator for receiving the first current from the current generator. Further, the first sub-circuit includes a first operational amplifier (OPAMP) connected between a first switch and the first transistor. In accordance with an embodiment of the present invention, a first terminal of the first OPAMP is connected to the first switch, and the output terminal of the first OPAMP is connected to a first terminal of the first transistor, a second switch, and a third switch. The first sub-circuit also includes a second transistor connected to the first electrical device. According to an embodiment of the present invention, a first terminal of the second transistor is connected to the second switch.

Similar to first sub-circuit, the current mirror circuit also includes a second sub-circuit corresponding to the second electrical device. The second sub-circuit includes a third transistor connected to the current generator for receiving the second current from the current generator. Further, the second sub-circuit includes a second OPAMP connected between a fourth switch and the third transistor. In accordance with an embodiment of the present invention, a first input terminal of the second OPAMP is connected to the fourth switch and the output terminal of the second OPAMP is connected to a first terminal of the third transistor, the third switch, and the second switch. Furthermore, the second sub-circuit includes a fourth transistor connected to the second electrical device. In accordance with an embodiment, a first terminal of the fourth transistor is connected to the third switch.

The first sub-circuit and the second sub-circuit mentioned above are connected to each other such that the first switch switches the first input terminal of the first OPAMP and the fourth switch switches the first input terminal of the second OPAMP between the first electrical device and the second electrical device with a predefined frequency. Also, the second switch switches the first terminal of the second transistor and the third switch switches the first terminal of the fourth transistor between the output terminals of the first OPAMP and the second OPAMP with the predefined frequency. In accordance with an embodiment of the present invention, the said predefined frequency is always above the flicker perception of the human eye (approximately 200 Hz) and below the maximum frequency of the permissible frequency bandwidth of the first OPAMP and the second OPAMP (approximately 500 kHz).

According to another embodiment of the present invention, an LED driver circuit for controlling current through a first LED and a second LED is provided. The LED driver circuit includes a current generator for generating a first current for the first LED and a second current for the second LED. Further, the current mirror circuit includes a first sub-circuit corresponding to the first LED. In accordance with an embodiment of the present invention, the first sub-circuit includes a first transistor connected to the current generator for receiving the first current from the current generator. The first sub-circuit further includes a first OPAMP connected between a first switch and the first transistor. A first input terminal of the first OPAMP is connected to the first switch, and the output terminal of the first OPAMP is connected to a first terminal of the first transistor, a second switch, and a third switch. The first sub-circuit also includes a second transistor connected to the first LED. In accordance with an embodiment of the present invention, a first terminal of the second transistor is connected to the second switch.

The LED driver circuit includes a second sub-circuit corresponding to the second LED. The second sub-circuit includes a third transistor connected to the current generator for receiving the second current from the current generator. The second sub-circuit further includes a second OPAMP connected between a fourth switch and the third transistor. In accordance with an embodiment of the present invention, a first terminal of the second OPAMP is connected to the fourth switch, and the output terminal of the second OPAMP is connected to a first terminal of the third transistor, the third switch, and the second switch. The second sub-circuit also includes a fourth transistor connected to the second LED. According to one embodiment, a first terminal of the fourth transistor is connected to the third switch.

The first sub-circuit and the second sub-circuit are connected to each other such that the first switch switches the first input terminal of the first OPAMP and the fourth switch switches the first input terminal of the second OPAMP between the first LED and the second LED with a predefined frequency. Also, the second switch switches the first terminal of the second transistor and the third switch switches the first terminal of the fourth transistor between the output terminals of the first OPAMP and the second OPAMP with the predefined frequency. In accordance with an embodiment of the present invention, the said predefined frequency is always above the flicker perception of the human eye (approximately 200 Hz) and below the maximum frequency of the permissible frequency bandwidth of the first OPAMP and the second OPAMP (approximately 500 kHz).

An objective of the present invention is to provide a current mirror circuit which matches current flowing in two electrical devices (like LEDs), even if the transistors included in the current mirror circuits are not exactly identical. Although the present invention is described in conjunction with two electrical devices, the invention can be applied to a more elaborate circuit involving more than two electrical devices, without departing from the scope of the invention.

BRIEF DESCRIPTION OF THE DRAWINGS

The preferred embodiments of the invention will hereinafter be described in conjunction with the appended drawings provided to illustrate, and not to limit, the invention, wherein like designations denote like elements, and in which.

DETAILED DESCRIPTION OF THE INVENTION

Figure 1:
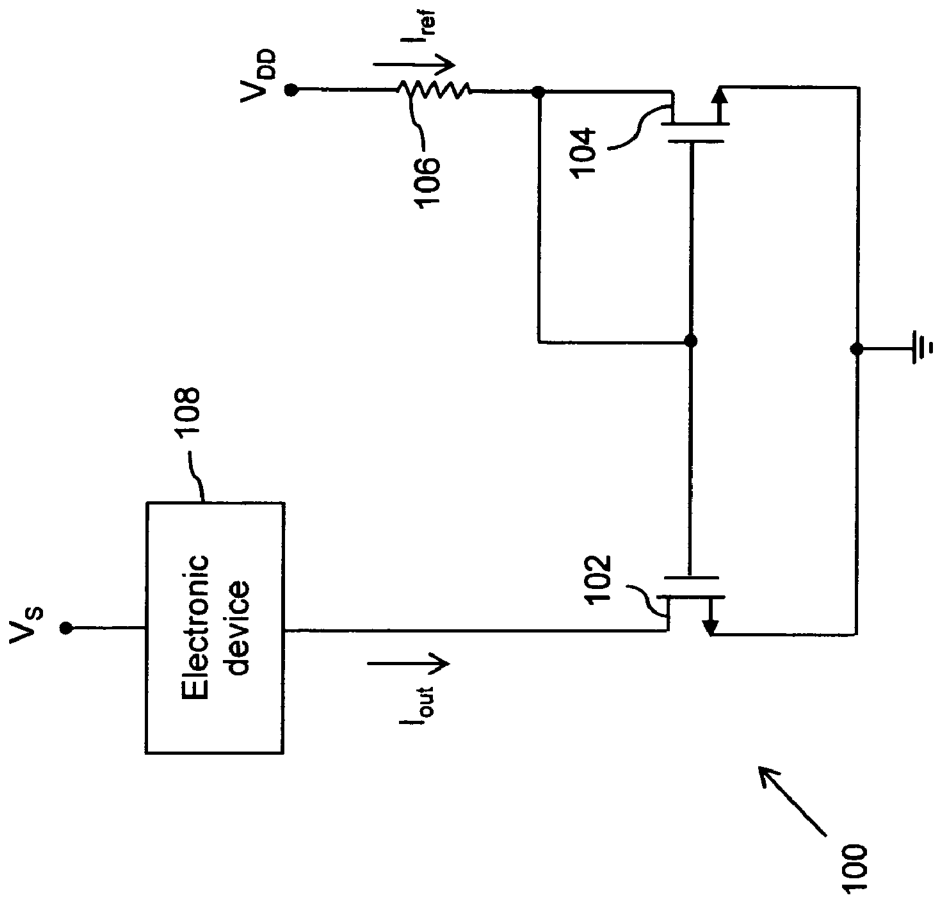
PRIOR ART FIG. 1
FIG. 1 illustrates a conventional current mirror circuit.
Figure 2:
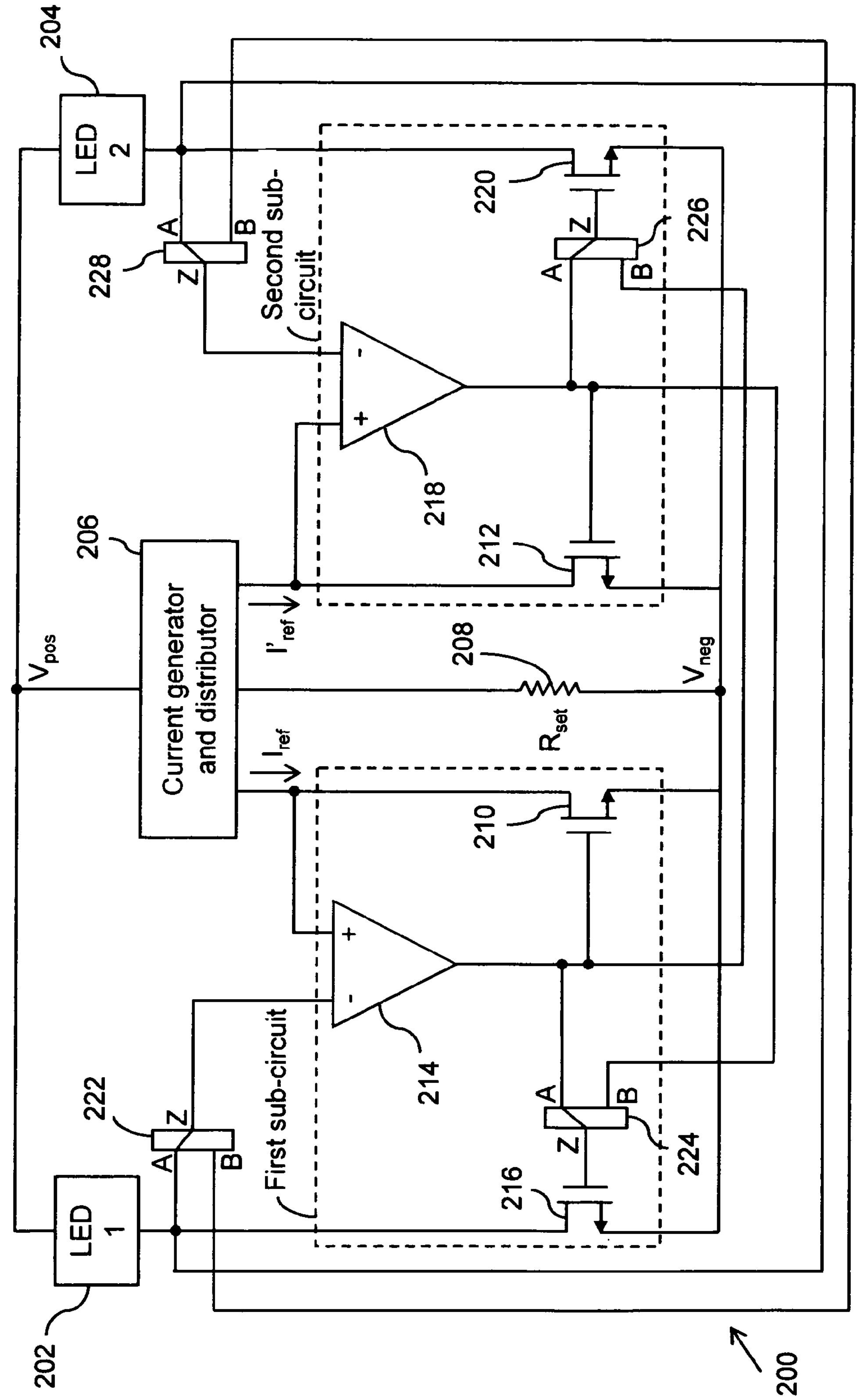
FIG. 2 illustrates a light emitting diode (LED) driver circuit, in accordance with an embodiment of the present invention.

FIG. 2 illustrates a light emitting diode (LED) driver circuit 200, in accordance with an embodiment of the present invention. LED driver circuit 200 is basically a current mirror circuit which matches current flowing through a first LED 202 and a second LED 204. As shown in FIG. 2, LED driver circuit 200 includes a current generator and distributor 206 which generates a first current $I_{ref}$ for first LED 202 and a second current $I'_{ref}$ for second LED 204. As depicted, current generator and distributor 206, first LED 202, and second LED 204 are all connected to a positive voltage terminal, shown as $V_{pos}$.

Current generator and distributor 206 can be any circuit or device that generates two equal-valued currents ($I_{ref}$ and $I'_{ref}$) and distributes them for first LED 202 and second LED 204. According to an embodiment of the present invention, the value of the generated currents $I_{ref}$ and $I'_{ref}$ is based on the value of a resistor 208 ($R_{set}$) connected to current generator and distributor 206. As depicted, resistor 208 is connected between current generator and distributor 206 and a negative voltage terminal $V_{neg}$.

In a traditional setup, the generated currents $I_{ref}$ and $I'_{ref}$ should be equal to each other as the same currents should be generated for both the LEDs. However, in practice, exactly the same currents cannot be generated and there is usually some difference between them. Due to this difference in currents and due to differences in various components of LED driver circuit 200 (the components of LED driver circuit 200 will be described in detail later), the currents flowing through first LED 202 and second LED 204 are usually not the same. To overcome this problem, LED driver circuit 200 uses a plurality of switches which continuously switch currents flowing through both the LEDs, and hence the average current flowing through these LEDs remains the same. The frequency of the "switching" of currents is usually higher than the flicker perception of human eye (approximately 200 Hz), and therefore a person viewing first LED 202 and second LED 204 fails to detect any variation in the illumination of either of the LEDs. The following will clearly explain the switching of currents between the two LEDs and the structure of LED driver circuit 200 in detail.

In accordance with an embodiment of the present invention, $I_{ref}$ is fed to a first sub-circuit of LED driver circuit 200 through a first transistor 210 and $I'_{ref}$ is fed to a second sub-circuit of the LED driver circuit 200 through a third transistor 212. In accordance with an embodiment of the present invention, first transistor 210 and third transistor 212 are identical to each other.

The first sub-circuit is connected to first LED 202 and includes first transistor 210, a first operational amplifier (OPAMP) 214, and a second transistor 216. In accordance with an embodiment of the present invention, second transistor 216 is a scaled version of first transistor 210, i.e., the current flowing through second transistor 216 is higher than and proportional to the current $I_{ref}$ flowing through first transistor 210. For example, if second transistor 216 is scaled 10 times as compared with first transistor 210, $10\times I_{ref}$ will flow through second transistor 216. Similar to the first sub-circuit, the second sub-circuit is connected to second LED 204 and includes third transistor 212, a second OPAMP 218, and a fourth transistor 220. Fourth transistor 220 is a scaled version of third transistor 212. This means a current higher than and proportional to the current $I'_{ref}$ flowing through third transistor 212 flows through fourth transistor 220.

Fourth transistor 220 and second transistor 216 are chosen to be scaled versions of third transistor 212 and first transistor 210, respectively, because scaling these transistors helps in attaining better current matching between first LED 202 and second LED 204. This is because current mismatch is predominately due to smaller transistors and not due to scaled ones. Therefore, fourth transistor 220 and second transistor 216 are scaled versions of third transistor 212 and first transistor 210, respectively, to ensure that current mismatch due to fourth transistor 220 and second transistor 216 is minimal, as compared to current mismatch due to first transistor 210 and third transistor 212. This aspect of LED driver circuit 200 will be elaborated later when the working of this circuit is described in detail.

As shown in FIG. 2, the drain of first transistor 210 and the drain of third transistor 212 are connected to current generator and distributor 206 to receive $I_{ref}$ and $I'_{ref}$ from it, respectively. Those ordinarily skilled in the art will know that this connection is only applicable if first transistor 210 and third transistor 212 are NMOS transistors or PMOS transistors. In case these transistors are NPN BJTs or PNP BJTs, their collector terminals are connected to current generator and distributor 206.

As depicted, the drain of first transistor 210 is connected to the positive input terminal of first OPAMP 214 and the drain terminal of third transistor 212 is connected to the positive terminal of second OPAMP 218. This is true only is the transistors are either NMOS transistors or PMOS transistors. If these are BJT transistors, their collector terminals are connected to the mentioned terminals of the OPAMPs.

As shown in FIG. 2, the drain of second transistor 216 is connected to first LED 202 and the drain of fourth transistor 220 is connected to second LED 204. Again, this connection applies to an NMOS transistor or a PMOS transistor. If these two transistors are BJTs, their collector terminals are connected to the mentioned LEDs. Also, in case all the four transistors, i.e., first transistor 210, second transistor 216, third transistor 212, and fourth transistor 220, are NMOS transistors (as shown in FIG. 2) or PMOS transistors, their source terminals are shorted together and connected to the negative voltage ($V_{neg}$). If they are BJTs, their emitter terminals are shorted together and connected to $V_{neg}$.

As depicted, the gates of first transistor 210 and third transistor 212 are connected to the output terminals of first OPAMP 214 and second OPAMP 218, respectively. Similar to the above description, this is true only if the two transistors are either NMOS transistors (as shown in FIG. 2), or PMOS transistors. If these are PNP BJTs or NPN BJTs, their base terminals are connected to the mentioned output terminals of the OPAMPs.

Apart from the components described above, LED driver circuit 200 also includes four switches. These are shown in FIG. 2 as a first switch 222, a second switch 224, a third switch 226, and a fourth switch 228. As depicted, the common terminal (shown as "Z") of first switch 222 is connected to the negative terminal of first OPAMP 214, and the other two terminals of first switch 222, shown as "A" and "B", are connected to first LED 202 and second LED 204, respectively. Also, the common terminal of fourth switch 228 is connected to the positive terminal of second OPAMP 218, and its "A" and "B" terminals are connected to second LED 204 and first LED 202, respectively.

The common terminal of second switch 224 is connected to the gate of second transistor 216, and its "A" and "B" terminals are connected to the output terminals of first OPAMP 214 and second OPAMP 218, respectively. Similarly, the common terminal of third switch 226 is connected to the gate of fourth transistor 220, and its "A" and "B" terminals are connected to the output terminals of second OPAMP 218 and first OPAMP 214, respectively. Those ordinarily skilled in the art will know that the above mentioned connections are valid only if second transistor 216 and fourth transistor 220 are either NMOS transistors (as shown in FIG. 2) or PMOS transistors. If they are PNP BJTs or NPN BJTs, their base terminals are connected to the common terminals of the mentioned switches, instead of gate terminals.

The following describes the operation of LED driver circuit 200 in detail.

As apparent from FIG. 2, the first sub-circuit (including first transistor 210, first OPAMP 214 and second transistor 216) is connected to the second sub-circuit (including third transistor 212, second OPAMP 218 and fourth transistor 220) through the four switches mentioned above. When all the switches are at terminal "A" (as shown in FIG. 2), the current flowing through first LED 202 is a scaled version of $I_{ref}$ and the current flowing through second LED 204 is a scaled version of $I'_{ref}$. This is because when all the switches are at terminal "A", the gate of second transistor 216 is connected to the output terminal of first OPAMP 214 and the gate of fourth transistor 220 is connected to the output terminal of second OPAMP 218. Also, the negative terminal of first OPAMP 214 is connected to the drain of second transistor 216 (which is also connected to first LED 202) and the negative terminal of second OPAMP 218 is connected to the drain of fourth transistor 220 (which is also connected to second LED 204).

In the connections mentioned above, the gates of first transistor 210 and second transistor 216 are shorted together, as are the gates of third and fourth transistors 212 and 220 in a similar fashion. This way, first transistor 210 and second transistor 216 are at the same gate to source voltage, and third transistor 212 and fourth transistor 220 are at the same gate to source voltage. Also, those ordinarily skilled in the art will know that in an OPAMP, the two input terminals are at equal potential. Therefore, the drain terminals of first transistor 210 and second transistor 216 are at the same potential, as both these terminals are connected to their respective input terminals of first OPAMP 214. Similarly, the drain terminals of third transistor 212 and fourth transistor 220 are connected to their respective input terminals of second OPAMP 218.

Since the gate voltages of first transistor 210 and second transistor 216 are the same and their drain to source voltages are also the same (since the input terminals of first OPAMP 214 are at the same potential), the current flowing through second transistor 216 is proportional to the current $I_{ref}$ flowing through first transistor 210. The reason why the current flowing through second transistor 216 is "proportional" to $I_{ref}$ is because second transistor 216 is a scaled version of first transistor 210. If both these transistors were similar, the current flowing through first transistor 210 and second transistor 216 would have been the same.

Similarly, the current flowing through fourth transistor 220 is proportional to the current $I'_{ref}$ flowing through third transistor 212, as the drain terminals of these transistors are at the same potential and their gate terminals are shorted. Also, since fourth transistor 220 is a scaled version of third transistor 212, the current flowing through these transistors is proportional but not the same.

The above case explains the scenario when all the switches are at terminal "A". When all the switches are at terminal "B", the negative input terminal of first OPAMP 214 is connected to second LED 204 and the negative input terminal of second OPAMP 218 is connected to first LED 202. Also, the gate of second transistor 216 gets connected to the output terminal of second OPAMP 218 and the gate of fourth transistor 220 gets connected to the output terminal of first OPAMP 214.

As a result, the current flowing through fourth transistor 220 (and second LED 204) becomes proportional to $I_{ref}$, and the current flowing through second transistor 216 (and first LED 202) becomes proportional to $I'_{ref}$. This is because, in the present case, the input terminals of first OPAMP 214 are connected between first transistor 210 and fourth transistor 220, and the gate terminal of fourth transistor 220 is shorted to the gate terminal of first transistor 210. Hence, the drain and gate voltages of first transistor 210 and fourth transistor 220 become equal, and therefore a current proportional to the current $I_{ref}$ flowing through first transistor 210 flows through fourth transistor 220. The same is true for the circuit involving second OPAMP 218, third transistor 212, and second transistor 216.

As apparent from the description above, when the switches are at terminal "A", the current flowing through first LED 202 is proportional to $I_{ref}$ and the current flowing through second LED 204 is proportional to $I'_{ref}$. When the switches are at terminal "B", the current flowing through first LED 202 is proportional to $I'_{ref}$ and the current flowing through second LED 204 is proportional to $I_{ref}$. If the states of the four switches mentioned above are changed so fast that a human eye cannot detect the change in illumination, a circuit is achieved where the same average current flows through the two LEDs (first LED 202 and second LED 204). This is precisely the methodology that is followed in the present invention. The four switches are switched together between terminals "A" and "B" with a frequency higher than the flicker perception of the human eye (approximately 200 Hz), and hence a person viewing the two LEDs is not able to detect any variation in the illumination of either of the LEDs. In accordance with an embodiment of the present invention, the frequency of switching is always kept below the maximum frequency of the permissible frequency bandwidth of the two OPAMPs of LED driver circuit 200. The typical maximum frequency is approximately 500 KHz. A suitable frequency of switching can be, for example, 10 KHz (higher than the flicker perception of human eye and well below the maximum frequency of the two OPAMPs).

Figure 3:
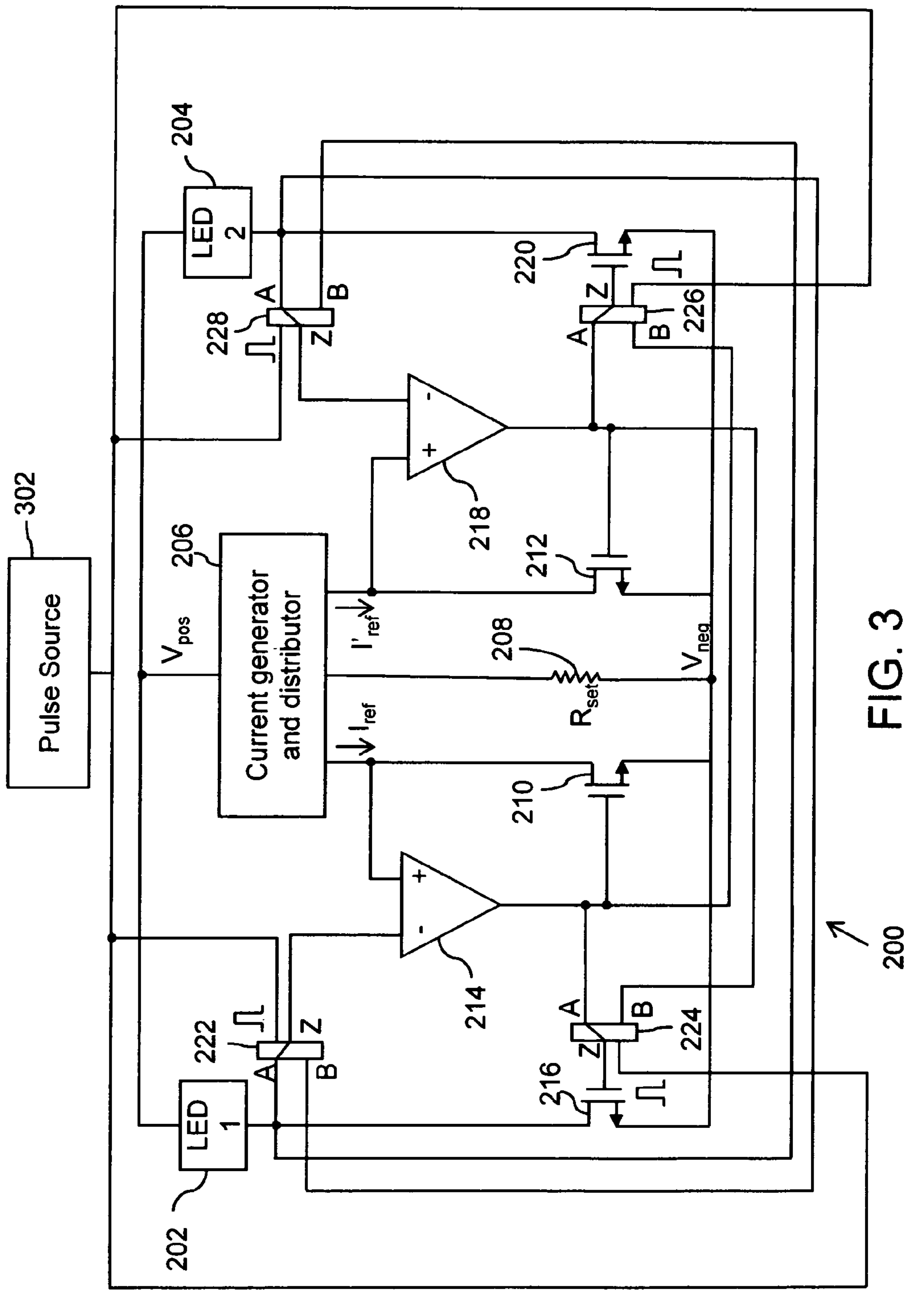
FIG. 3 illustrates a pulse source connected to the LED driver circuit, in accordance with an embodiment of the present invention.

In accordance with an embodiment of the present invention, the switching states of the four switches of LED driver circuit 200 can be driven by an internal or external pulse source. This embodiment is shown in FIG. 3, where a pulse source 302 is connected to LED driver circuit 200. Pulse source 302 can either be an external pulse source or an internal pulse source of LED driver circuit 200. Those ordinarily skilled in the art will appreciate that in this case, the switches alternate when there is a transition in the signal of pulse source 302. For example, the switches alternate when the signal of pulse source 302 either goes from high to low or from low to high.

There may also be a scenario where there are two separate pulse sources (either internal or external) connected to LED driver circuit 200. (This case is not shown in FIG. 3). In this case, the use of an external pulse source works fine provided the frequency of the external pulse source is kept above the flicker perception of human eye (and below the maximum frequency of the permissible frequency bandwidth of the two OPAMPs). Those ordinarily skilled in the art will know that sometimes the external pulse source will be required to have a 100% duty cycle to provide full output current in the LEDs. When this occurs, a situation may arise in which there is no switching of the current sources and hence the current matching in the two LEDs will suffer. To overcome this potential issue, the present invention detects when an external 100% duty cycle pulse source is applied, and then automatically switches over to an internal pulse source to resume switching the current sources and hence maintain good matching.

In accordance with an embodiment of the present invention, the external pulse source can be, for example, a pulse width modulator (PWM).

Those ordinarily skilled in the art will appreciate that there can be other ways also to alternate the four switches of LED driver circuit 200, and switching through an external pulse source is described only as an example. The present invention can also work efficiently with other means of switching.

Although FIGS. 2 and 3 are described in conjunction with LEDs, those ordinarily skilled in the art will appreciate that the circuits shown in FIGS. 2 and 3 can also be used to match current between other electrical devices as well. This is because the circuit shown in FIG. 2 is basically a current mirror circuit and can be used to mirror current between any two electrical devices. Also, in another embodiment of the present invention, a circuit similar to the one shown in FIG. 2 can be used to match current between more than two LEDs or electrical devices. This circuit will use the same principle as that of LED driver circuit 200, but will involve a more elaborate, yet easy to implement, switching matrix.

Various embodiments of the present invention provide an advantage of better current matching between two electrical devices. Those ordinarily skilled in the art will know that in conventional current mirror circuits, current mismatch is mainly dominated by smaller transistors (first transistor 210 and third transistor 212), current distribution, and input offsets at the two OPAMPs. To alleviate this problem, the present invention utilizes a scaled version of first transistor 210 for second transistor 216, and a scaled version third transistor 212 for fourth transistor 220. This way, only the "bigger" transistors (second transistor 216 and fourth transistor 220) are permanently connected to the two LEDs. The rest of the components of LED driver 200 (which are predominately the reason for current mismatch) keep on switching between the two LEDs. Therefore, using the present invention, better current matching is obtained, as only the two bigger transistors are the cause of current mismatch in LED driver circuit 200 and the current mismatch because of these two transistors is very small because these transistors are large.

Another advantage of the present invention is that it allows LED driver circuit 200 to work over a wide range of LED voltage drops. Those ordinarily skilled in the art will know that when the transistors of LED driver circuit 200 are working in saturation mode, the current through them is given by, $I=\beta\times(V_{GS}-V_{TH})^2\times(W/L)$. Since this current depends only on gate to source voltage (since $V_{TH}$ is constant), the LED driver circuit works well in saturation region as the gate terminals of transistors are shorted through the use of switches.

However, when the current through first LED 202 and second LED 204 changes (for example by varying $R_{set}$), the drain to source voltages across transistors 216 and 220 also change. This may result in a condition that these transistors start to operate in a linear mode. In the linear mode, current through a transistor is given by $I=\beta\times[V_{GS}-V_{TH})\times V_{DS}-(V_{DS}^2/2)]\times(W/L)$. As apparent from the equation, this current not only depends on gate to source voltage, but also on drain to source voltage. To ensure that LED driver circuit 200 also works well in the linear mode, the drain to source voltages of the transistors should be the same. This is done by the OPAMPs included in LED driver circuit 200, which maintain the same drain voltage of the transistors connected to their input terminals (due to the OPAMP's property of maintaining equal potential at its input terminals). This way, LED driver circuit 200 works well not only in a saturation mode, but also in a linear mode, thus enabling current matching over a wide range of LED voltage drops.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention as described in the claims.

What is claimed is:

1. A light emitting diode (LED) driver circuit for controlling current through a first LED and a second LED, the LED driver circuit comprising:

- a current generator for generating a first current for the first LED and a second current for the second LED;
- a first sub-circuit connected to the first LED, the first sub-circuit comprising:
  - a first transistor connected to the current generator for receiving the first current from the current generator;
  - a first operational amplifier (OPAMP) connected between a first switch and the first transistor, wherein a first input terminal of the first OPAMP is connected to the first switch, and an output terminal of the first OPAMP is connected to a first terminal of the first transistor, a second switch and a third switch;
  - a second transistor connected to the first LED, wherein a first terminal of the second transistor is connected to the second switch; and
- a second sub-circuit connected to the second LED, the second sub-circuit comprising:
  - a third transistor connected to the current generator for receiving the second current from the current generator;
  - a second OPAMP connected between a fourth switch and the third transistor, wherein a first input terminal of the second OPAMP is connected to the fourth switch, and an output terminal of the second OPAMP is connected to a first terminal of the third transistor, the third switch and the second switch;
  - a fourth transistor connected to the second LED, wherein a first terminal of the fourth transistor is connected to the third switch;
- wherein the first sub-circuit and the second sub-circuit are connected to each other such that:
  - the first switch switches the first input terminal of the first OPAMP and the fourth switch switches the first input terminal of the second OPAMP between the first LED and the second LED with a predefined frequency; and
  - the second switch switches the first terminal of the second transistor and the third switch switches the first terminal of the fourth transistor between the output terminals of the first OPAMP and the second OPAMP with the predefined frequency.

2. The LED driver circuit of claim 1, wherein the first transistor and the third transistor are at least one of n-type metal-oxide-semiconductor (NMOS) transistors and p-type metal-oxide-semiconductor (PMOS) transistors, and a drain of the first transistor and a drain of the third transistor are connected to the current generator.

3. The LED driver circuit of claim 1, wherein the first transistor and the third transistor are at least one of NPN bipolar junction transistors (BJTs) and PNP BJTs, and a collector of the first transistor and a collector of the third transistor are connected to the current generator.

4. The LED driver circuit of claim 1, wherein the first transistor and the third transistor are at least one of NMOS transistors and PMOS transistors and a drain of the first transistor is connected to a second input terminal of the first OPAMP and a drain of the third transistor is connected to a second input terminal of the second OPAMP.

5. The LED driver circuit of claim 1, wherein the first transistor and the third transistor are at least one of NPN BJTs and PNP BJTs, and a collector of the first transistor is connected to the second input terminal of the first OPAMP and a collector of the third transistor is connected to the second input terminal of the second OPAMP.

6. The LED driver circuit of claim 1, wherein the second transistor and the fourth transistor are at least one of NMOS transistors and PMOS transistors and a drain of the second transistor is connected to the first LED and a drain of the fourth transistor to the second LED.

7. The LED driver circuit of claim 1, wherein the second transistor and the fourth transistor are at least one of NPN BJTs and PNP BJTs and a collector of the second transistor is connected to the first LED and a collector of the fourth transistor is connected to the second LED.

8. The LED driver circuit of claim 1, wherein the first transistor, the second transistor, the third transistor and the fourth transistor are at least one of NMOS transistors and PMOS transistors and source terminals of the first transistor, the second transistor, the third transistor and the fourth transistor are shorted together.

9. The LED driver circuit of claim 1, wherein the first transistor, the second transistor, the third transistor and the fourth transistor are at least one of NPN BJTs and PNP BJTs and emitter terminals of the first transistor, the second transistor, the third transistor and the fourth transistor are shorted together.

10. The LED driver circuit of claim 1, wherein the switching states of the first switch, the second switch, the third switch and the fourth switch are driven by a pulse source.

11. The LED driver circuit of claim 1, wherein the first transistor, second transistor, third transistor and fourth transistor is one of NMOS transistor and PMOS transistor and the first terminal of the first transistor, second transistor, third transistor and fourth transistor is a gate terminal.

12. The LED driver circuit of claim 1, wherein the first transistor, second transistor, third transistor and fourth transistor is one of NPN BJT and PNP BJT and the first terminal of the first transistor, second transistor, third transistor and fourth transistor is a base terminal.

13. A current mirror circuit for controlling current through a first electrical device and a second electrical device, the current mirror circuit comprising:

- a current generator for generating a first current for the first electrical device and a second current for the second electrical device;
- a first sub-circuit connected to the first electrical device, the first sub-circuit comprising:
  - a first transistor connected to the current generator for receiving the first current from the current generator;
  - a first operational amplifier (OPAMP) connected between a first switch and the first transistor, wherein a first input terminal of the first OPAMP is connected to the first switch, and an output terminal of the first OPAMP is connected to a first terminal of the first transistor, a second switch and a third switch;

a second transistor connected to the first electrical device, wherein a first terminal of the second transistor is connected to the second switch; and a second sub-circuit connected to the second electrical device, the second sub-circuit comprising:

a third transistor connected to the current generator for receiving the second current from the current generator;

a second OPAMP connected between a fourth switch and the third transistor, wherein a first input terminal of the second OPAMP is connected to the fourth switch, and an output terminal of the second OPAMP is connected to a first terminal of the third transistor, the third switch and the second switch;

a fourth transistor connected to the second electrical device, wherein a first terminal of the fourth transistor is connected to the third switch;

wherein the first sub-circuit and the second sub-circuit are connected to each other such that:

the first switch switches the first input terminal of the first OPAMP and the fourth switch switches the first input terminal of the second OPAMP between the first electrical device and the second electrical device with a predefined frequency; and the second switch switches the first terminal of the second transistor and the third switch switches the first terminal of the fourth transistor between the output terminals of the first OPAMP and the second OPAMP with the predefined frequency.

14. The current mirror circuit of claim 13, wherein the first transistor and the third transistor are at least one of n-type metal-oxide-semiconductor (NMOS) transistors and p-type metal-oxide-semiconductor (PMOS) transistors, and a drain of the first transistor and a drain of the third transistor are connected to the current generator.

15. The current mirror circuit of claim 13, wherein the first transistor and the third transistor are at least one of NPN bipolar junction transistors (BJTs) and PNP BJTs, and a collector of the first transistor and a collector of the third transistor are connected to the current generator.

16. The current mirror circuit of claim 13, wherein the first transistor and the third transistor at least one of NMOS transistors and PMOS transistors, and a drain of the first transistor is connected to a second input terminal of the first OPAMP and a drain of the third transistor is connected to a second input terminal of the second OPAMP.

17. The current mirror circuit of claim 13, wherein the first transistor and the third transistor are at least one of NPN BJTs and PNP BJTs, and a collector of the first transistor is connected to the second input terminal of the first OPAMP and a collector of the third transistor is connected to the second input terminal of the second OPAMP.

18. The current mirror circuit of claim 13, wherein the second transistor and the fourth transistor are at least one of NMOS transistors and PMOS transistors, and a drain of the second transistor is connected to the first electrical device and a drain of the fourth transistor to the second electrical device.

19. The current mirror circuit of claim 13, wherein the second transistor and the fourth transistor are at least one of NPN BJTs and PNP BJTs, and a collector of the second transistor is connected to the first electrical device and a collector of the fourth transistor to the second electrical device.

20. The current mirror circuit of claim 13, wherein the first transistor, the second transistor, the third transistor and the fourth transistor are at least one of NMOS transistors and PMOS transistors, and the source terminals of the first transistor, second transistor, third transistor and fourth transistor are shorted together.

21. The current mirror circuit of claim 13, wherein the first transistor, the second transistor, the third transistor and the fourth transistor are at least one NPN BJTs and PNP BJTs, and the emitter terminals of the first transistor, the second transistor, the third transistor and the fourth transistor are shorted together.

22. The current mirror circuit of claim 13, wherein the switching states of the first switch, the second switch, the third switch and the fourth switch are driven by a pulse source.

23. The current mirror circuit of claim 13, wherein the first transistor, the second transistor, third transistor and the fourth transistor is one of NMOS transistor and PMOS transistor, and the first terminal of the first transistor, the second transistor, third transistor and the fourth transistor is a gate terminal.

24. The current mirror circuit of claim 13, wherein the first transistor, the second transistor, third transistor and the fourth transistor is one of NPN BJT and PNP BJT, and the first terminal of the first transistor, the second transistor, third transistor and the fourth transistor is a base terminal.

* * * * *